United States Patent [19]

Dicker

[11] Patent Number: 4,732,955

[45] Date of Patent: Mar. 22, 1988

[54] GROUP TRANSFER POLYMERIZATION CATALYZED BY MERCURY COMPOUNDS

[75] Inventor: Ira B. Dicker, Wilmington, Del.

[73] Assignee: E. I. Du Pont de Nemours and Company, Wilmington, Del.

[21] Appl. No.: 912,118

[22] Filed: Sep. 29, 1986

[51] Int. Cl.$^4$ .................... C08F 4/44; C08F 4/16; C08F 4/10

[52] U.S. Cl. .................... 526/188; 526/194

[58] Field of Search ............ 526/192, 128, 183, 196, 526/188

[56] References Cited

U.S. PATENT DOCUMENTS

| | | | |
|---|---|---|---|
| 3,155,643 | 11/1964 | Baron et al. | 526/194 |
| 3,272,786 | 9/1966 | Perry | 526/194 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/194 |
| 4,550,094 | 10/1985 | Hanji et al. | 526/128 |
| 4,567,243 | 1/1986 | Pullukat et al. | 526/128 |
| 4,581,428 | 4/1986 | Farnham et al. | 526/190 |
| 4,588,795 | 5/1986 | Dicker et al. | 526/192 |
| 4,605,716 | 8/1986 | Hertler | 526/190 |

FOREIGN PATENT DOCUMENTS 186330  7/1986  European Pat. Off. ........... 526/194

OTHER PUBLICATIONS

C.A. vol. 98, entry 222607r.
C.A. vol. 83, entry 164663h.
Webster et al., J. Amer. Chem. Soc., 105, 5706 (1983).
Razuvaev et al., Vysokokol. Soedin. (B), 25 (2):122–125 (1983).
Sakurai et al., Tetrahedron Lett., 21:2325–2328 (1980).
Burlachenko et al., Zhur, Obshchei Khim., 43(8):1724–1732 (1973).
Litvinova et al., Dokl. Akad. Nauk. SSSR, 173(3) 578–580 (1967); CA 67: 32720j.
Baukov et al., Dokl. Akad. Nauk. SSSR. 157(1):119–121 (1964); CA 61:8333f.
Satchell et al., Qtr. Rev. Chem. Socl, 25:171 (1971).

Primary Examiner—Joseph L. Schofer
Assistant Examiner—Peter F. Kulkosky

[57] ABSTRACT

Mercury compounds which are useful as co-catalysts in group transfer polymerization are disclosed.

18 Claims, No Drawings

GROUP TRANSFER POLYMERIZATION CATALYZED BY MERCURY COMPOUNDS

BACKGROUND OF THE INVENTION

1. Field of the Invention

This invention relates to Group Transfer Polymerization of acrylates catalyzed by selected mercury compounds.

2. Background

U.S. Pat. Nos. 4,414,372; 4,417,034; 4,508,880; 4,524,196; 4,581,428; 4,588,795; and 4,605,716, and commonly assigned U.S. patent applications Ser. Nos. 627,919 filed July 5, 1984; 660,588 filed Oct. 18, 1984; 673,926 filed Nov. 21, 1984; 771,684, 771,685 and 771,686 filed Sept. 3, 1985; 786,101 filed Oct. 15, 1985; and 872,610 filed June 10, 1986; referred to hereinafter as "the aforesaid patents and patent applications", disclose processes for polymerizing an acrylic or maleimide monomer to a "living" polymer in the presence of an initiator, which is a tetracoordinate organosilicon, organotin or organogermanium compound having at least one initiating site, and a co-catalyst which is a source of fluoride, bifluoride, cyanide or azide ions or a suitable Lewis acid, Lewis base or selected oxyanion. Such polymerization processes have become known in the art as Group Transfer Polymerization (Webster et al., *J. Am. Chem. Soc.*, 105: 5706 (1983)).

Preferred monomers for use in Group Transfer Polymerization are selected from acrylic and maleimide monomers of the formula $CH_2=C(Y)X$ and

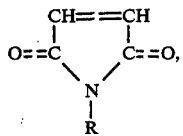

and mixtures thereof,
wherein:
X is $-CN$, $-CH=CHC(O)X'$ or $-C(O)X'$;
Y is $-H$, $-CH_3$, $-CN$ or $-CO_2R$, provided, however, when X is $-CH=CHC(O)X'$, Y is $-H$ or $-CH_3$;
X' is $-OSi(R^1)_3$, $-R$, $-OR$ or $-NR'R''$;
each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;
R is:
  (a) a hydrocarbyl radical which is an aliphatic, alicyclic, aromatic or mixed aliphatic-aromatic radical containing up to 20 carbon atoms;
  (b) a polymeric radical containing at least 20 carbon atoms;
  (c) a radical of (a) or (b) containing one or more ether oxygen atoms within aliphatic segments thereof;
  (d) a radical of (a), (b) or (c) containing one or more functional substituents that are unreactive under polymerizing conditions; or
  (e) a radical of (a), (b), (c) or (d) containing one or more reactive substituents of the formula $-Z'(O)-C-C(Y^1)=CH_2$ wherein $Y^1$ is $-H$ or $-CH_3$ and Z' is O or NR' wherein R' is as defined below; and
each of R' and R'' is independently selected from $C_{1-4}$ alkyl.

Preferred initiators are selected from tetracoordinate organsilicon, organotin and organogermanium compounds of the formulas Q'MZ, Q''M(Z$^1$)$_2$ and $[Z^1(Q'')M]_2O$
wherein:
Q' is $[X''(R^1)_q]_{3-x}(R^1)_x$;
Q'' is $[X''(R^1)_q]_{2-y}(R^1)_y$;
each X'', independently, is O, N or S;
q is 1 or, when X'' is N, 2;
x is 0, 1 or 2;
y is 0 or 1;
$R^1$ is as defined above for the monomer;
Z is an activating substituent selected from the group consisting of $-CN$,

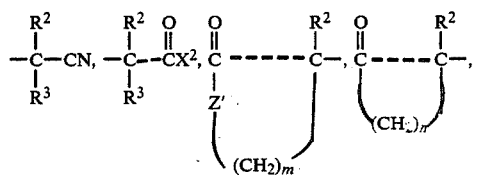

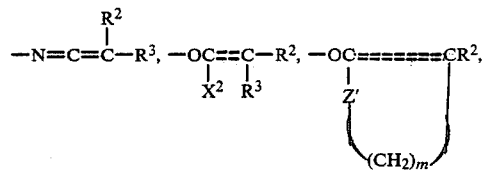

$-SR'$, $-OP(NR'R'')_2$, $-OP(OR^1)_2$, $-OP[OSi(R^1)_3]_2$ and mixtures thereof;
R', R'', R and $R^1$ are as defined above for the monomer;
$Z^1$ is

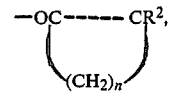

$X^2$ is $-OSi(R^1)_3$, $-R^6$, $-OR^6$ or $-NR'R''$;
$R^6$ is
  (a) a hydrocarbyl radical which is an aliphatic, alicyclic, aromatic or mixed aliphatic-aromatic radical containing up to 20 carbon atoms;
  (b) a polymeric radical containing at least 20 carbon atoms;
  (c) a radical of (a) or (b) containing one or more ether oxygen atoms within aliphatic segments thereof;
  (d) a radical of (a), (b) or (c) containing one or more functional substituents that are unreactive under polymerizing conditions; or
  (e) a radical of (a), (b), (c) or (d) containing one or more initiating sites; and each of $R^2$ and $R^3$ is independently selected from $-H$ and hydrocarbyl, defined as for $R^6$ above, subparagraphs (a) to (e);
R', R'' and $R^1$ are as defined above for the monomer;
Z' is as defined above for the monomer;
m is 2, 3 or 4;
n is 3, 4 or 5;
$R^2$ and $R^3$ taken together are provided Z is

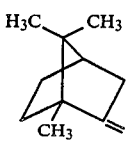

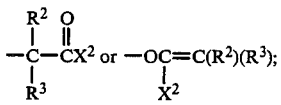

$X^2$ and either $R^2$ or $R^3$ taken together are

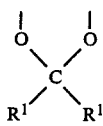

provided Z is

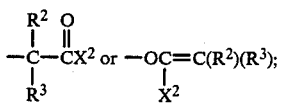

and
M is Si, Sn, or Ge., provided, however, when Z is

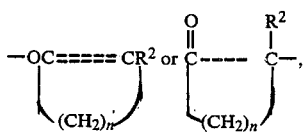

M is Sn or Ge.

Preferred co-catalysts are selected from a source of bifluoride ions $HF_2^-$, or a source of fluoride, cyanide or azide ions, or a source of oxyanions, said oxyanions being capable of forming a conjugate acid having a pKa (DMSO) of about 5 to about 24, preferably about 6 to about 21, more preferably 8 to 18, or a suitable Lewis acid, for example, zinc chloride, bromide or iodide, boron trifluoride, an alkylaluminum oxide or an alkylaluminum chloride, or a suitable Lewis base, for example, a Lewis base of the formula selected from $(R^4)_3M'$ and

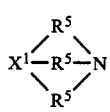

wherein:
M' is P or As;
$X^1$ is

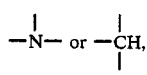

provided, however, when the monomer is a nitrile, $X^1$ is

each $R^4$, independently, is:
(a) a $C_{1-12}$ alkyl, $C_{4-12}$ cycloalkyl, $C_{6-12}$ aralkyl or di($C_{1-4}$ alkyl)amino group;
(b) a group of (a) wherein two or three of the alkyl, cycloalkyl and/or aralkyl groups are joined together by means of one or more carbon-carbon bonds;
(c) a group of (a) or (b) wherein the alkyl, cycloalkyl and/or aralkyl groups contain within aliphatic segments thereof one or more hetero atoms selected from O, N and S; or
(d) a group of (a), (b) or (c) wherein the alkyl, cycloalkyl and/or aralkyl groups contain one or more substituents that are unreactive under polymerizing conditions; and each $R^5$ is $-CH_2CH_2-$ or $-CH_2CH_2-$ containing one or more alkyl or other substituents that are unreactive under polymerizing conditions.

Additional details regarding Group Transfer Polymerization can be obtained from the aforesaid patents and patent applications, the disclosures of which are hereby incorporated by reference.

Razuvaev et al., *Vysokomol. Soedin.* (B), 25(2): 122–125 (1983) disclose polymerization of methyl methacrylate and/or styrene initiated by a mixture of silicon tetrachloride and alkyls of mercury, tin or lead, at 20°–50° C. Sakurai et al., *Tetrahedron Lett.*, 21: 2325–2328 (1980) disclose mercuric iodide catalyzed isomerization of (trimethylsilylmethyl)chloromethyl ketone to (1-chloromethyl ethenyl)oxytrimethylsilane.

Burlachenko et al., *Zhur. Obschchei Khim.*, 43(8): 1724–1732 (1973) disclose isomerization of cis-ketene silyl acetals into the trans-isomer catalyzed by triethylsilyl bromide and mercuric bromide. Litvinova et al., abstract of *Dokl. Akad. Nauk. SSSR*, 173(3): 578–580 (1967); CA 67: 32720j, disclose the mercuric iodide-catalyzed rearrangement of triethylacetonylsilane to (isopropenyloxy)triethylsilane.

Baukov et al., abstract of *Dokl. Akad. Nauk. SSSR*, 157(1): 119–121 (1964); CA 61: 8333f, disclose the mercuric iodide-catalyzed rearrangement of (1-methoxy-1-ethenyloxy)triethylsilane to methyl 2-triethylsilylacetate.

Satchell et al., *Qtr. Rev. Chem Soc.*, 25: 171 (1971) disclose that mercuric halides are very weakly acidic Lewis acids.

The present invention provides mercury containing catalysts which can be used in Group Transfer Polymerization of selected acrylic monomers. There is no suggestion in any of the foregoing references that such or similar mercury containing compounds would be useful as catalysts in Group Transfer Polymerization.

SUMMARY OF THE INVENTION

The present invention provides a Group Transfer Polymerization process comprising contacting under polymerizing conditions at least one acrylic monomer of the formula $CH_2=CHC(O)X'$ with a tetracoordinate organosilicon initiator and co-catalyst. The process is further characterized in that the co-catalyst is a mercury compound of the formula $R^7HgI$ or $HgL_2$, wherein the formulas, L is I or $ClO_4$;

X' is $-OSi(R^1)_3$, $-R$, $-OR$ or $-NR'R''$;

each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;

R is:
- (a) a hydrocarbyl radical which is an aliphatic, alicyclic, aromatic or mixed aliphatic-aromatic radical containing up to 20 carbon atoms;
- (b) a polymeric radical containing at least 20 carbon atoms;
- (c) a radical of (a) or (b) containing one or more ether oxygen atoms within aliphatic segments thereof;
- (d) a radical of (a), (b) or (c) containing one or more functional substituents that are unreactive under polymerizing conditions; or
- (e) a radical of (a), (b), (c) or (d) containing one or more reactive substituents of the formula $-Z'(O)-C-CH=CH_2$ wherein Z' is O or NR'; and each of R' and R'' is independently selected from $C_{1-4}$ alkyl; and $R^7$ is a hydrocarbyl radical having 1 to 10 carbon atoms.

Preferably X' is OR and R is $C_{1-4}$ alkyl, most preferably methyl. Preferably $R^7$ is aromatic, most preferably phenyl. The preferred co-catalyst is mercuric iodide.

DETAILED DESCRIPTION OF THE INVENTION

The present invention provides a Group Transfer Polymerization process wherein the co-catalyst is a mercury compound as described above. Suitable tetracoordinate organosilicon initiators for use in this process include those of the formula $Q'SiZ$, $Q''Si(Z^1)_2$ or $[Z^1(Q'')Si]_2O$ wherein:

Q' is $[X''(R^1)_q]_{3-x}(R^1)_x$;

Q'' is $[X''(R^1)_q]_{2-y}(R^1)_y$;

each X'', independently, is O, N or S;

q is 1 or, when X'' is N, 2;

x is 0, 1, 2 or 3;

y is 0, 1 or 2;

Z is $-OC(X^2)=C(R^2)(R^3)$,

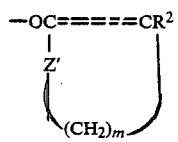

or mixtures thereof;

$Z^1$ is $-OC(X^2)=C(R^2)(R^3)$;

$X^2$ is $-OSi(R^1)_3$, $-R^6$, $-OR^6$ or $-NR'R''$;

each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;

$R^6$ is:
- (a) a hydrocarbyl radical which is an aliphatic, alicyclic, aromatic or mixed aliphatic-aromatic radical containing up to 20 carbon atoms;
- (b) a polymeric radical containing at least 20 carbon atoms;
- (c) a radical of (a) or (b) containing one or more ether oxygen atoms within aliphatic segments thereof;
- (d) a radical of (a), (b) or (c) containing one or more functional substituents that are unreactive under polymerizing conditions; or
- (e) a radical of (a), (b), (c) or (d) containing one or more initiating sites;

each of $R^2$ and $R^3$ is independently selected from H or a hydrocarbyl or polymeric radical defined as for $R^6$;

Z' is O or NR';

m is 2, 3 or 4; and each of R' and R'' is independently selected from $C_{1-4}$ alkyl.

Preferably: $R^{1-3}$ are each methyl, x is 3, $X^2$ is $OR^6$ and $R^6$ is $C_{1-4}$ alkyl, most preferably methyl.

By initiating site is meant a group comprising a silicon-containing moiety such as $-Si(R^1)_3$, $-SiQ'$ or $-SiQ''$ wherein $R^1$, Q' and Q'' are defined as above, derived from a Group Transfer Polymerization initiator.

The present process provides "living" polymers, including block and star-branched polymers prepared by methods similar to those described in the aforesaid patents and patent applications. By "living" polymer is meant a polymer which contains at least one initiating site and is capable of polymerizing further in the presence of monomer(s) and catalyst.

In the process of this invention, temperatures, operable solvents, concentrations of starting materials, and precautions against moisture are as in the foregoing patents and applications. However, it is generally preferable to employ less polar solvents such as hydrocarbons, although chlorinated hydrocarbons and, less preferably, nitriles and ethers can be used. It is also generally preferable to employ the mercury-containing co-catalysts of the present invention in a concentration of about 0.1 to about 100 mole % of initiator present (i.e. about 0.001 to about 1 mole of co-catalyst per mole of initiator). Most preferably, the co-catalyst is employed at a concentration of from about 5 to about 20 mole % of initiator present (i.e. about 0.05 to about 0.2 mole of co-catalyst per mole of initiator).

Suitable monomers for use in the present process include alkyl acrylates and N,N dialkyl acrylamides, as indicated above. These monomers, together with the suitable initiators described above, are disclosed in the aforesaid patents and applications.

The polymers provided by the process of the invention are generally similar, and have similar utility, to those described in the aforesaid patents and applications. The "living" polymers may be quenched by reaction with a protic material such as water or methanol, or capped with appropriate capping agents. Functionality can be introduced into the polymers by employing either a monomer or initiator containing functional substituents that are either inert under polymerizing conditions or are protected, or by employing a functionalized capping agent, as described in the aforesaid patents and applications. Examples 17 and 19 illustrate the preparation of telechelic polymers by the use of functionalized initiator and capping agent, resulting in functional groups at each end of the polymer chain. Telechelic polymers are especially useful in the preparation of block, chain-extended or cross-linked polymers, including thermoplastic elastomers, and the present process is especially useful for preparing telechelic polyacrylates having a high degree of terminal difunctionality.

In the following examples of the invention, weight and number average molecular weights of the polymer products ($\overline{M}_w$, $\overline{M}_n$) were measured by gel permeation chromatography (GPC). The polydispersity of the polymer is defined by $D = \overline{M}_w/\overline{M}_n$. Unless otherwise specified, the "living" polymer products were quenched by exposure to moist air or methanol before molecular weights were determined. Differential scanning calorimetry (DSC) was used to measure glass transition temperature of the products. Parts and percentages are by weight and temperatures are in degrees Celsius unless otherwise specified.

EXAMPLE 1

Polymerization of Ethyl Acrylate Catalyzed by Mercuric Iodide

To a solution of 0.40 mL (2 mmole) [(1-methoxy-2-methyl-1-propenyl)oxy]trimethylsilane (MTS) in 20 mL of toluene containing 0.09 g (0.2 mmole) mercuric iodide at 0° C. in a cooling bath was added 10 mL (92.3 mmole) ethyl acrylate monomer at a rate of 0.18 mL/minute. At the end of the monomer addition the temperature of the resulting mixture was 3.2° and the mercuric iodide began to dissolve. The mixture was removed from the cooling bath and polymerization set in with the temperature of the mixture rising to 51.0° over a 15 minute period. After an additional 28 minutes, a sample of the resulting product was removed for GPC analysis ($\overline{M}_n$ 3690, $\overline{M}_w$ 4310, D=1.17; $\overline{M}_n$ theory 4320) and 5.00 mL (46.1 mmole) of additional ethyl acrylate monomer was added. An exotherm, which indicated that further polymerization occurred, carried the temperature to 41.8° and, after 20 hours, a sample of the resulting product was removed for GPC analysis ($\overline{M}_n$ 7120, $\overline{M}_w$ 8700, D=1.22; theory 7110). At that time the addition of a further 5.00 mL (46.1 mmole) of ethyl acrylate monomer did not produce an exotherm, and stripping of volatiles revealed a quantitative yield of polymer corresponding to the polymerization of only the first 15.0 mL of monomer. GPC analysis, however, revealed slight broadening of the molecular weight distribution ($\overline{M}_n$ 7930, $\overline{M}_w$ 11,400, D=1.43) indicating further polymerization. When the experiment was performed in the absence of MTS, no polymerization was observed, as evidenced by the absence of residue on evaporation of volatiles.

EXAMPLE 2

Polymerization of Ethyl Acrylate Catalyzed by Mercuric Iodide

To a rapidly stirring solution of 10.0 mL (92.3 mmole) of ethyl acrylate monomer in 20 mL of acetonitrile containing 0.09 g (0.2 mmole) mercuric iodide at 0.4° was added 0.40 mL (2.0 mmole) of MTS. The temperature of the resulting mixture quickly rose to 61.8° then receded. After 80 minutes, a sample was withdrawn from the resulting product for GPC analysis; $\overline{M}_n$ 3770; $\overline{M}_w$ 6360; D 1.69; theor. $\overline{M}_n$ 4720. An additional 5.0 mL (46.1 mmole) ethyl acrylate monomer was then added but did not produce an exotherm. Upon workup, a quantitative yield of poly(ethyl acrylate) corresponding to the first 10.0 mL of ethyl acrylate monomer was obtained showing no change by GPC analysis.

EXAMPLE 3

Polymerization of Methyl Acrylate Catalyzed by Mercuric Iodide

To a stirred solution of 0.40 mL (2.0 mmoles) of MTS in 20 mL of dichloromethane containing 0.09 g (0.2 mmole) mercuric iodide was added 10.0 mL (79.4 mmole) methyl acrylate monomer at a rate of 0.2 mL/minute. The temperature of the resulting mixture rose to 30° then receeded during the early stage of monomer addition. After complete addition of monomer, the mixture was cooled to 3.4° and 0.20 mL (1.0 mmole) of MTS was added. The resulting mixture exothermed to 25.2° and re-cooled to 2° whereupon the introduction of a further 5.0 mL methyl acrylate monomer did not result in further polymerization. After removing volatiles, 10 g of poly(methyl acrylate) were obtained. The yield was consistent with polymerization of the first 10.0 mL of methyl acrylate. GPC: $\overline{M}_n$ 10,600, $\overline{M}_w$ 14,500, D 1.34.

EXAMPLE 4

Polymerization of Ethyl Acrylate Catalyzed by Mercuric Iodide

A solution of 60.0 mL (0.56 mole) of ethyl acrylate monomer, 100 mL of tetrahydrofuran (THF), 0.20 mL (1.0 mmole) of MTS and 50 L of 1M mercuric iodide in THF (0.05 mmoles) was stirred for two days then quenched with methanol and stripped of volatiles. A 96% yield of poly(ethyl acrylate) was obtained. $\overline{M}_n$ 18,700; $\overline{M}_w$ 65,000; D 3.47; theor. $\overline{M}_n$ 53,700.

EXAMPLE 5

Polymerization of Ethyl Acrylate Catalyzed by Mercuric Iodide

To a solution of 20 mL toluene and 50.0 mL (0.46 mole) ethyl acrylate monomer containing 0.10 g (0.25 mmole) of mercuric iodide at 0° in an ice bath was added 0.20 mL (1.0 mmole) of MTS. After 1 hour the ice bath was removed and the temperature rose to 28.4°. The resulting reaction mixture was stirred but not heated for 2 days (a slight exotherm persisted throughout that period). The mixture was then quenched with methanol and stripped of volatiles giving 25.5 g (55%) of poly(ethyl acrylate). GPC: $\overline{M}_n$ 34,600; $\overline{M}_w$ 54,100; D 1.56; theor. $\overline{M}_n$ for 55% conversion, 25,500.

EXAMPLE 6

Polymerization of Methyl Acrylate Catalyzed by Mercuric Iodide

To a stirred mixture of 20 mL toluene, 0.10 g (0.25 mmole) mercuric iodide and 0.40 mL (2.0 mmole) of MTS, was added 5.0 mL (55 mmoles) of methyl acrylate monomer at a rate of 0.5 mL/minute. The mixture exothermed on contact with the monomer slowly climbing to 47.2°, 7 minutes after all monomer had been added. 4.9 g (100%) of poly(methyl acrylate) were obtained. GPC: $\overline{M}_n$ 2440; $\overline{M}_w$ 3360; D 1.38; theor; $\overline{M}_n$ 2390.

EXAMPLE 7

Polymerization of Butyl Acrylate Catalyzed by Mercuric Iodide

The procedure of Example 6 was substantially repeated except that 5.00 mL (35 mmoles) of butyl acrylate (0.5 mL/minute) were substituted for methyl acrylate. The reaction mixture exothermed, reaching a peak temperature of 42.0°, 7 minutes after monomer addition was complete. 4.9 g (100%) of poly(butyl acrylate) were obtained. GPC: $\overline{M}_n$ 2230; $\overline{M}_w$ 2870; D 1.20; theor. $\overline{M}_n$ 2340.

EXAMPLE 8

Preparation of a Methyl/Butyl Acrylate Block Copolymer

To a stirred mixture of 20 mL toluene, 0.10 g (0.25 mmole) of mercuric iodide and 0.40 mL (2.0 mmole) of MTS was added 5.00 mL (55.5 mmoles) methyl acrylate monomer at a rate of 0.5 mL/minute. The reaction mixture exothermed to 41.2°, 7 minutes after the end of monomer addition and then 5.0 mL (34.9 mmoles) of butyl acrylate monomer were added at a rate of 0.5 mL/minute. The reaction mixture continued to exotherm during this monomer addition, reaching a peak of 47.6°, 3 minutes after the butyl acrylate monomer addition was complete. After 1.5 hours, the reaction was quenched with methanol and stripped of volatiles to give 9.2 g of polymer product (96%). GPC: $\overline{M}_n$ 4710; $\overline{M}_w$ 6650; D 1.41; theor. $\overline{M}_n$ 4645. DSC measurements revealed a single glass transition temperature (TG) of −20.5°.

EXAMPLE 9

Preparation of a Butyl Acrylate/Methyl Acrylate Block Copolymer

The procedure of Example 8 was substantially repeated except that the order of monomer addition was reversed. The butyl acrylate monomer was added before the methyl acrylate monomer. The polymer yield was quantitative. GPC: $\overline{M}_n$ 3930; $\overline{M}_w$ 5520; D 1.41; theor. $\overline{M}_n$ 4645. DSC measurements on this polymer again revealed a Tg of −20.5°.

EXAMPLE 10

Preparation of Ethyl Acrylate Catalyzed by Mercuric Iodide

The procedure of Example 6 was substantially repeated except that 0.32 mL (1.0 mmoles) of [(1-[2-trimethylsiloxy]ethoxy-2-methyl-1-propenyl)oxy]trimethylsilane was used in place of MTS and 10.0 mL of ethyl acrylate monomer added at a rate of 0.3 mL/minute were used in place of methyl acrylate. Methanol quenching and stripping under reduced pressure gave 9.9 g (100%) of polymer product. GPC: $\overline{M}_n$ 10,300; $\overline{M}_w$ 16,000; D 1.56; theor. $\overline{M}_n$ 9,900.

EXAMPLE 11

Polymerization of Ethyl Acrylate Catalyzed by Mercuric Iodide

To a stirred mixture of 0.10 g (0.25 mmole) mercuric iodide in 20 mL toluene and 10.0 mL (92.2 mmoles) ethyl acrylate monomer was added 0.20 mL (1.0 mmole) of MTS. The reaction mixture exothermed slowly reaching 45.8° over 26 minutes. After stripping off volatiles, 9.7 g (100%) of poly(ethyl acrylate) was obtained. GPC: analysis gave $\overline{M}_n$ 9910; $\overline{M}_w$ 11,700; D 1.18; theor. $\overline{M}_n$ 9340, indicating closer polymerization control and narrower molecular weight distribution as compared to a similar experiment using initiator first followed by a monomer feed; $\overline{M}_n$ 8090; $\overline{M}_w$ 16300; D 1.52; theor. $\overline{M}_n$ 9340.

EXAMPLE 12-14

Polymerization of Butyl Acrylate Catalyzed by Mercuric Iodide

In Example 12, the procedure of Example 11 was substantially repeated except that 20 mL of dimethylformamide (DMF) were used instead of toluene, and 10.0 mL butyl acrylate monomer was used instead of ethyl acrylate. An 81% yield of poly(butyl acrylate) was obtained; $\overline{M}_n$ 12900; $\overline{M}_w$ 53300; D 4.12; theor. $\overline{M}_n$ 9340. In Example 13, the procedure of Example 12 was substantially repeated except that 20 mL of hexane were used in instead of DMF. A 100% yield of poly(butyl acrylate) was obtained; $\overline{M}_n$ 8620; $\overline{M}_w$ 8930; D 1.04; theor. $\overline{M}_n$ 9340. In Example 14, the procedure of Example 12 was substantially repeated except that 20 mL of ethyl acetate were used in instead of DMF. An 86% yield of poly(butyl acrylate) was obtained; $\overline{M}_n$ 7010; $\overline{M}_w$ 8800; D 1.26; theor. $\overline{M}_n$ 9340.

EXAMPLE 15

Polymerization of Butyl Acrylate Catalyzed by Mercuric Iodide

The procedure of Example 11 was substantially repeated except that 0.18 mL (1.0 mmoles) of [(1-methoxy-1-propenyl)oxy]trimethylsilane and 10.0 mL of butyl acrylate monomer were used in place of MTS and ethyl acrylate monomer. A quantitative yield of poly(butyl acrylate) was obtained; $\overline{M}_n$ 10100; $\overline{M}_w$ 11100; D 1.10; theor. $\overline{M}_n$ 9294.

EXAMPLE 16

Polymerization of N,N,-Dimethylacrylamide Catalyzed by Mercuric Iodide

To a rapidly stirring solution of 10 mL (97.0 mmole) of n,n-dimethylacrylamide in 20 mL acetonitrile containing 0.10 g (0.22 mmole) of mercuric iodide, was added 0.20 mL (1.0 mmole) of MTS. The temperature of the resulting reaction mixture rose rapidly and refluxed the solvent within 2 minutes. After cooling, the reaction mixture was allowed to stand overnight then poured into hexane. An oily mass resulted, which settled out on the bottom. This material was washed several times with hexane then dried under high vacuum to give 9.8 g (99%) of poly(n,n-dimethylacrylamide); $\overline{M}_n$ 5130; $\overline{M}_w$ 7680; D 1.50; theor. $\overline{M}_n$ 9830.

EXAMPLE 17

Preparation of Telechelic Poly(Ethyl Acrylate)

To a stirred solution of 20 mL toluene, 0.10 g (0.25 mmole) mercuric iodide and 5.0 mL (46 mmole) of ethyl acrylate monomer, was added 0.32 mL (1.0 mmole) of [(1-[2-trimethylsiloxy]ethoxy-2-methyl-1-propenyl)oxy]trimethylsilane. After 16 minutes the resulting reaction mixture reached a maximum temperature of 39.2°. After an additional 5 minutes, 0.12 mL (1.2 mmoles) of benzaldehyde was added to the mixture. After 2 hours, the resulting polymer product was stripped of solvent under reduced pressure then triturated several times with hexane to remove residual toluene. The resulting residue was kept under high vacuum for 2 days to give 2.9 g of poly(ethyl acrylate) (61% conversion). The $\overline{M}_n$ of the polymer product is shown in Table 1. Proton nmr (CDCL$_3$ or CD$_3$CN) established a degree of difuntionality of 96–100%).

TABLE 1

$\overline{M}_n$ of Poly(ethyl acrylate) Prepared with Mercuric Iodide Catalyst

| $\overline{M}_n$ | Method |
|---|---|
| 2800 | calc. based on conversion |
| 2940–3000 | nmr |
| 2510; D = 1.02 | GPC |

EXAMPLE 18

Polymerization of Ethyl Acrylate Catalyzed by Phenyl Mercuric Iodide

To 20 mL of acetonitrile containing 10.0 mL (92.3 mmoles) of ethyl acrylate monomer and a suspension of 0.1 g (0.25 mmole) phenyl mercuric iodide, was added 0.20 mL of MTS. The resulting reaction mixture slowly exothermed, attaining a maximum temperature of 41.4° after 72 minutes. After a total reaction time of 5.7 hours, the resulting polymer product was quenched with methanol and stripped of solvent to give 5.6 g (60%) of poly(ethyl acrylate); $\overline{M}_n$ 5610; $\overline{M}_w$ 7790; D 1.39; theor. $\overline{M}_n$ (based on conversion), 5600.

EXAMPLE 19

Preparation of Telechelic Poly(Ethyl Acrylate)

To a stirred solution of 0.1 g (0.25 mmol) of mercuric iodide and 1.0 mL of [(1-[2-trimethylsiloxy]ethoxy-2-methyl-1-propenyloxy]trimethylsilane (3.0 mmol) in 20 mL of toluene was added 5.0 mL of ethyl acrylate. The temperature rose to 36.4° over a 10 min period and an ice-bath was used to maintain a temperature of 30°–36°. Forty-five minutes after monomer addition, the polymerization was terminated by the addition of 0.25 mL of 1,3-dioxolane as capping agent. The polymer was stripped of solvent to obtain 5.8 g (100%) of poly(ethyl acrylate); proton NMR (CDCl$_3$) indicated a degree of difunctionality of 85–90%. The polymer was then hydrolyzed by dissolution in a 9:1 mixture of THF and water containing a drop of concentrated hydrochloric acid. After extraction into dichloromethane, the polymeric diol was obtained. Molecular weight ($\overline{M}_n$) of the diol: 1800 (calcd., based on monomer conversion); 1850 (by NMR); 1310 (by GPC).

In other, similar experiments, difunctionality was increased to over 98% by lowering catalyst concentration and maintaining polymerization temperature below 30°.

Condensation polymerization of a poly(ethyl acrylate) diol (PEA diol) of 98–100% difunctionality with an equimolar amount of m-toluenediisocyanate (MDI) gave a block poly(ethyl acrylate)-poly(urethane) copolymer (Table 2, Run 1).

End-capping of a PEA diol with 2 equivalents of MDI, followed by reaction with an equimolar amount of low-molecular weight diol or diamine chain-extender gave clear, elastomeric films when cast from solution (Table 2, Runs 2–4).

PEA diol+MDI+diol/diamine→poly(ethyl acrylate-urethane)

TABLE 2

Properties of Telechelic Poly(Ethyl Acrylate) Prepared with Mercuric Iodide Catalyst

| Run | Diol/diamine | $\overline{M}_w/\overline{M}_n$ | $\eta_{inh}$ | Tg(°C.) |
|---|---|---|---|---|
| 1 | — | 52600/14300 | 0.28 | 1 |
| 2 | (CH$_2$)$_2$(OH)$_2$ | 115000/25600 | 0.48 | 25 |
| 3 | (CH$_2$)$_4$(OH)$_2$ | 103000/29400 | 0.43 | 16 |
| 4 | (CH$_2$)$_2$(NH$_2$)$_2$ | — | 0.28 | 8,195 |

| Run | Elongation at Break (%) | Strength at Break (psi) |
|---|---|---|
| 2 | 268 | 1011 |
| 3 | 557 | 905 |

What is claimed is:

1. A Group Transfer Polymerization process that produces a "living" polymer comprising contacting under polymerizing conditions at least one acrylic monomer of the formula CH$_2$=CHC(O)X' with a tetracoordinate organosilicon initiator of the formula $$Q'SiZ, Q''Si(Z^1)_2 \text{ or } [Z^1(Q'')Si]_2O$$

wherein:
Q' is [X''(R$^1$)$_q$]$_{3-x}$(R$^1$)$_x$);
Q'' is [X''(R$^1$)$_q$]$_{2-y}$(R$^1$)$_y$;
each X'', independently, is O, N or S;
q is 1 or, when X'' is N, 2;
x is 0, 1, 2 or 3;
y is 0, 1 or 2;
Z is —OC(X$^2$)=C(R$^2$)(R$^3$),

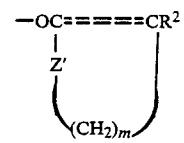

or mixtures thereof;
Z$^1$ is —OC(X$^2$)=C(R$^2$)(R$^3$);
X$^2$ is —OSi(R$^1$)$_3$, —R$^6$, —OR$^6$ or —NR'R'';
R$^6$ is:
  (a) a hydrocarbyl radical which is an aliphatic, alicyclic, aromatic or mixed aliphatic-aromatic radical containing up to 20 carbon atoms;
  (b) a polymeric radical containing at least 20 carbon atoms;
  (c) a radical of (a) or (b) containing one or more ether oxygen atoms within aliphatic segments thereof;
  (d) a radical of (a), (b) or (c) containing one or more functional substituents that are unreactive under polymerizing conditions; or
  (e) a radical of (a), (b), (c) or (d) containing one or more initiating sites;
each of R$^2$ and R$^3$ is independently selected from H and a hydrocarbyl or polymeric radical defined as for R$^6$;
Z' is O or NR'; and
m is 2, 3 or 4
and co-catalyst, said process is further characterized in that the co-catalyst is a mercury compound of the formula R$^7$HgI or HgL$_2$,
wherein the formulas,
L is I or ClO$_4$;
X' is —OSi(R$^1$)$_3$, —R, —OR or —NR'R'';
each R$^1$, independently, is a hydrocarbyl radical which is an aliphatic, alicyclic, aromatic or mixed aliphatic-aromatic radical containing up to 20 carbon atoms or —H, provided that at least one $R^1$ group is not —H;

R is:
(a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more reactive substituents of the formula —Z'-(O)C—CH=CH$_2$ wherein Z' is O or NR'; and each of R' and R" is independently selected from C$_{1-4}$ alkyl; and $R^7$ is a hydrocarbyl radical having 1 to 10 carbon atoms.

2. Process of claim 1 wherein X' is OR.

3. Process of claim 2 wherein R is an alkyl group having 1 to 4 carbon atoms.

4. Process of claim 1 wherein Z is an $X^2$-containing moiety and $X^2$ is $OR^6$.

5. Process of claim 4 wherein $R^1$ is methyl; each of $R^2$ and $R^3$, independently, is H or hydrocarbyl containing up to 20 carbon atoms; and x is 3.

6. Process of claim 5 wherein $R^6$ is hydrocarbyl of up to 20 carbon atoms.

7. Process of claim 6 wherein hydrocarbyl of $R^6$ contains one or more functional substituents that are unreactive under polymerizing conditions.

8. Process of claim 6 wherein hydrocarbyl of $R^6$ contains one or more initiating sites.

9. Process of claim 7 wherein hydrocarbyl of $R^6$ contains one or more initiating sites.

10. Process of claim 6 wherein the initiator has the formula Q'SiZ.

11. Process of claim 10 wherein hydrocarbyl is methyl.

12. Process of claim 1 wherein the co-catalyst is mercuric iodide.

13. Process of claim 1 wherein R is hydrocarbyl of up to 20 carbon atoms.

14. Process of claim 13 wherein hydrocarbyl of R contains one or more functional substituents that are unreactive under polymerizing conditions.

15. Process of claim 13 wherein hydrocarbyl of R contains one or more initiating sites.

16. Process of claim 14 wherein hydrocarbyl of R contains one or more initiating sites.

17. Process of claim 3 wherein R is methyl.

18. Process of claim 1 wherein the co-catalyst is phenylmercuric iodide.

* * * * *